(12) United States Patent
Chen et al.

(10) Patent No.: US 8,285,575 B2
(45) Date of Patent: Oct. 9, 2012

(54) METHOD AND SYSTEM FOR PROVIDING AN INFERENCE ENGINE INCLUDING A PARAMETER-BASED COST FUNCTION TO EVALUATE SEMICONDUCTOR CLIENTS

(75) Inventors: Yu Jen Chen, Taipei (TW); Jiann-Yeh Ou, Tainan (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 2040 days.

(21) Appl. No.: 10/811,007

(22) Filed: Mar. 25, 2004

(65) Prior Publication Data

US 2005/0216353 A1 Sep. 29, 2005

(51) Int. Cl.
*G06Q 10/00* (2012.01)
(52) U.S. Cl. .................................................. 705/7.12
(58) Field of Classification Search ............. 705/7, 7.11, 705/7.12
See application file for complete search history.

(56) References Cited

U.S. PATENT DOCUMENTS

| | | | | |
|---|---|---|---|---|
| 4,744,028 | A * | 5/1988 | Karmarkar | 705/8 |
| 4,912,648 | A | 3/1990 | Tyler | |
| 5,642,471 | A | 6/1997 | Paillet | |
| 5,970,465 | A * | 10/1999 | Dietrich et al. | 705/7 |
| 5,999,920 | A * | 12/1999 | Sato et al. | 705/400 |
| 6,151,582 | A * | 11/2000 | Huang et al. | 705/8 |
| 6,788,985 | B2 * | 9/2004 | Mitsutake et al. | 700/97 |
| 6,922,676 | B2 * | 7/2005 | Alnwick | 705/28 |
| 6,928,334 | B2 * | 8/2005 | Kuo | 700/115 |
| 7,295,990 | B1 * | 11/2007 | Braumoeller et al. | 705/7.31 |
| 2004/0015386 | A1 | 1/2004 | Abe et al. | |
| 2005/0278046 | A1 * | 12/2005 | Suttile et al. | 700/97 |

FOREIGN PATENT DOCUMENTS

TW 497058 B 8/2002

OTHER PUBLICATIONS

Brown, et al; "A Centralized Approach to Factory Simulation", 1997, Future Fab International, pp. 1-9.*
Jain, et al; "Criticality of Detailed Modelling in Semiconductor Supply Chain Simulation", Proceedings of the 1999 Winter Simulation Conference, pp. 1-9.*
Rasmussen; "Integration simulation with activity-based management to evaluate manufacturing cell part sequencing", 1999, Computers & Industrial Engineering 37, pp. 757-768.*
Spedding, T.A.; Sun, G.Q.; "Application of discrete event simulation to the activity based costing of manufacturing systems", 1999, International Journal of Production Economics, 58, pp. 289-301.*
Takakuwa, Soemon; "The use of Simulation in Activity-based costing for flexible manufacturing systems", 1997, Proceedings of the 1997 Winter Simulation Conference, pp. 793-800.*

(Continued)

*Primary Examiner* — Jonathan G Sterrett
(74) *Attorney, Agent, or Firm* — Haynes and Boone, LLP

(57) ABSTRACT

An inference engine is configured to rank a plurality of clients using at least one parameter associated with each of the plurality of clients. The engine includes a user interface configured to enable a user to select the at least one parameter, a knowledge collection module configured to collect client information based on the at least one parameter, and a calculation module configured to receive the collected information and calculate a client listing using a parameter-based cost function.

22 Claims, 7 Drawing Sheets

OTHER PUBLICATIONS

Miller, David J; "Simulation of a semiconductor manufacturing line", Oct. 1990, Proceedings of the ACM, vol. 33, No. 10, pp. 99-108.*

Hood, Sarah J; Welch, Peter D; "Response Surface Methodology and Its Application in Simulation", Proceedings of the 1993 Winter Simulation Conference, pp. 115-122.*

Czarnecki, Hank; Schroer, Bernard J; Rahman, M. Mizzanur; "Using Simulation to Schedule Manufacturing Resources", 1997, Proceedings of the 1997 Winter Simulation Conference, pp. 750-757.*

Whitman, Larry; Huff, Brian; Palaniswamy, Senthil; "Commercial Simulation over the Web", 1998, Proceedings of the 1998 Winter Simulation Conference, pp. 335-339.*

Nembhard, Harriet Black; Kao, Ming-Shu; Lim, Gino; "Integrating Discrete-Event Simulation with Statistical Process Control Charts for Transitions in a Manufacturing Environment", 1999, Proceedings of the 1999 Winter Simulation Software, pp. 701-708.*

Potoradi, et al; "Determining Optimal Lot size for a Semiconductor back-end Factory", 1999, Proceedings of the 1999 Winter Simulation Conference, pp. 720-726.*

"SAP Partnership", 2001 webpage of PMGBenchmarking.com, retrieved from http://web.archive.org/web/20010210225119/www.pmgbenchmarking.com/sap/sap_4.html.*

Research in object-oriented manufacturing simulations: an assessment of the state of the art—S Narayanan, DA Bodner, T Govindaraj, LF . . . —IIE transactions, 1998—Springer.*

Panel Session: The Future of Simulation BA Peters, JS Smith, DJ Medeiros, MW . . . —Proceedings of the 2001 Winter Simulation Conference, 2001—informs-sim.org.*

Optimization of cycle time and utilization in semiconductor test manufacturing using simulation based, on-line, near-real-time scheduling system. AI Sivakumar—Simulation Conference Proceedings, 1999 Winter, 1999—ieeexplore.ieee.org.*

Simulating test program methods in semiconductor assembly test factories BA Peters, JS Smith, DJ Medeiros, MW . . . —Proceedings of the 2001 Winter Simulation Conference, 2001—simulation.section.informs.org.*

"Development of the order fulfillment process in the foundry fab by applying distributed multi-agents on a generic message-passing platform" [PDF] from ntu.edu.tw CY Yu . . . —Mechatronics, IEEE/ASME Transactions . . . , 2001—ieeexplore.ieee.org.*

"Semiconductor industry evolution for 21st century", FC Tseng—VLSI Circuits, 1999. Digest of Technical Papers. . . . , 1999—ieeexplore.ieee.org.*

"News from TSMC", Tsai, Rick; Simulation 2001.*

Foundry technologies FC Tseng—Electron Devices Meeting, 1996., International, 1996—ieeexplore.ieee.org.*

Taiwan Patent Office, Taiwan Office Action of Dec. 16, 2008, Appl. No. 093123485, 6 pages.

* cited by examiner

600

602 — Scope
Region: ● All   ○ Asia   ○ Europe   ○ USA
DSA:    ○ Included   ● Excluded
Time period:   Start from [1▼]  months ago
Top [30▼] Companies 604 — Calculation Method
○ Non-normalized      ● Normalized 606 — Weighting        ○ List details Process: 0.13 and below [1▼]  0.15~0.25 [1▼]  0.25 and above [0▼]
Tech file down load:    Tech files        [1▼]
Library download:                [1▼]
Chip implementation:   Projects           [1▼]
Reference flow download:          [1▼]
NTO:                [1▼]

Fig. 6

METHOD AND SYSTEM FOR PROVIDING AN INFERENCE ENGINE INCLUDING A PARAMETER-BASED COST FUNCTION TO EVALUATE SEMICONDUCTOR CLIENTS

BACKGROUND

The present invention relates to semiconductor fabrication facilities, and more specifically, to a method and system for evaluating semiconductor clients.

Since the invention of the integrated circuit (IC), the semiconductor industry has been growing dramatically to today's ultra-large scale IC's (ULSIC's) by technological progress not only in materials, design, and processing, but also in fabrication automation. Advances in IC technology, coupled with a movement towards mass production, provide a driving force for automation. Automation brings higher quality, shorter cycle time and lower cost, which in return drive broader IC applications and higher market demand.

Semiconductor technologies are complicated because they involve systems, design, equipment, material, manufacturing, testing, and packaging. Another reason for the complexity of semiconductor technologies is that they involve so many diverse technical areas including logic, analog, mixed signal, radio frequency (RF), memory (such as dynamical random access memory (DRAM), static random access memory (SRAM), and magnetic random access memory (MRAM)), micro-electro-mechanical system (MEMS), and high power. Semiconductor technologies are now regarded as being more mature since the semiconductor industry has well defined and accepted standards including standard cells and standard manufacturing technologies which are further enhanced by standard equipment. The increased complexity, maturation and scaling progress in semiconductor technologies has brought a trend of global coordination in which every device starting from concept through specification, design, manufacturing, packaging and testing all the way down to final product may go through many semiconductor companies, each of which focuses on a specific area. For example, an IC design house or fabless company focuses on IC design, and a foundry focuses on wafer manufacturing.

A semiconductor manufacturer could have a very large portfolio of clients or customers. Each customer may have its own portfolio of products which can range broadly in product types, technologies, volumes, schedules and other factors. For a semiconductor manufacture to best serve the interests of its customers, it is desirable for the semiconductor manufacturer to know its customers' technologies, production types, volumes, schedules, and trends.

What is needed is a system and method to assist semiconductor manufacturers in evaluating customers according to their needs efficiently and quantitatively.

BRIEF DESCRIPTION OF THE DRAWINGS

FIG. 6 is a schematic view of one embodiment of a screen display in a method of inference engine having a parameter-based cost function constructed according to aspects of the present disclosure.

DETAILED DESCRIPTION

Figure 1:
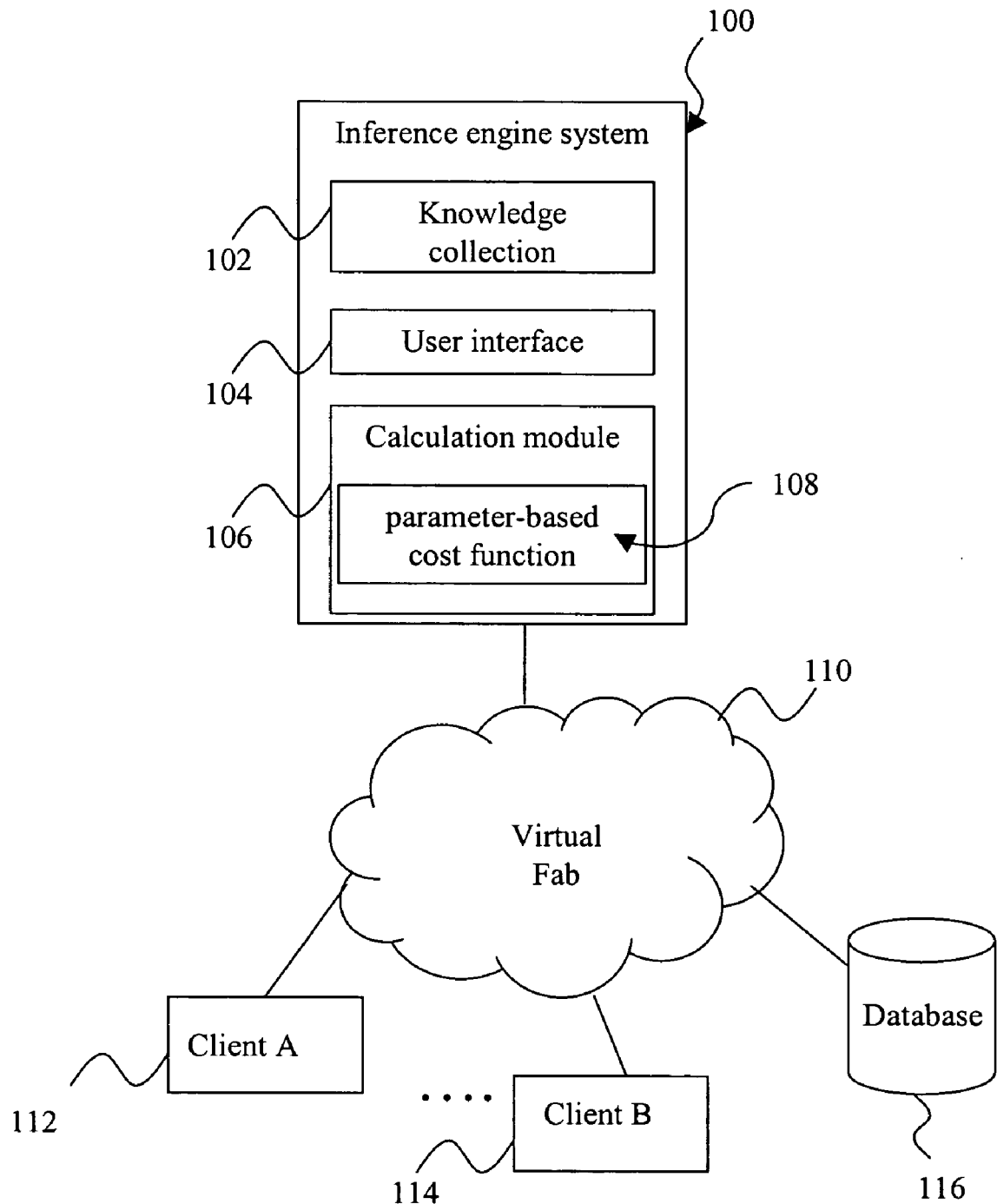
FIG. 1 is a block diagram of one embodiment of a system for inference engine having a parameter-based cost function constructed according to aspects of the present disclosure.

The present invention relates to semiconductor fabrication facilities, and more specifically, to a method and system employing an inference engine including a parameter-based cost function to evaluate semiconductor clients.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In the following description, the terms client, company, and customer are used interchangeably. A client is not necessarily a customer or company. A client can be an internal party. More generally, a client can be an entity such as a product, equipment, a process, and a manufacturer depending on applications. For example, semiconductor products can be analyzed and ranked by an inference engine including a parameter-based cost function for yield trend, manufacturing volume trend, wafer scrap trend, and price trend. Similarly, equipment, process, or manufacturer may be evaluated and ranked by an inference engine including a parameter-based cost function.

FIG. 1 is a block diagram of one embodiment of an inference engine 100 having a parameter-based cost function constructed according to aspects of the present disclosure. An inference engine is defined as a control mechanism that applies knowledge present in a knowledge base or knowledge collection to task-specific data to arrive at some conclusion. The particular inference engine 100 includes a knowledge collection module 102, a user interface 104, and a calculation module 106.

Figure 3:
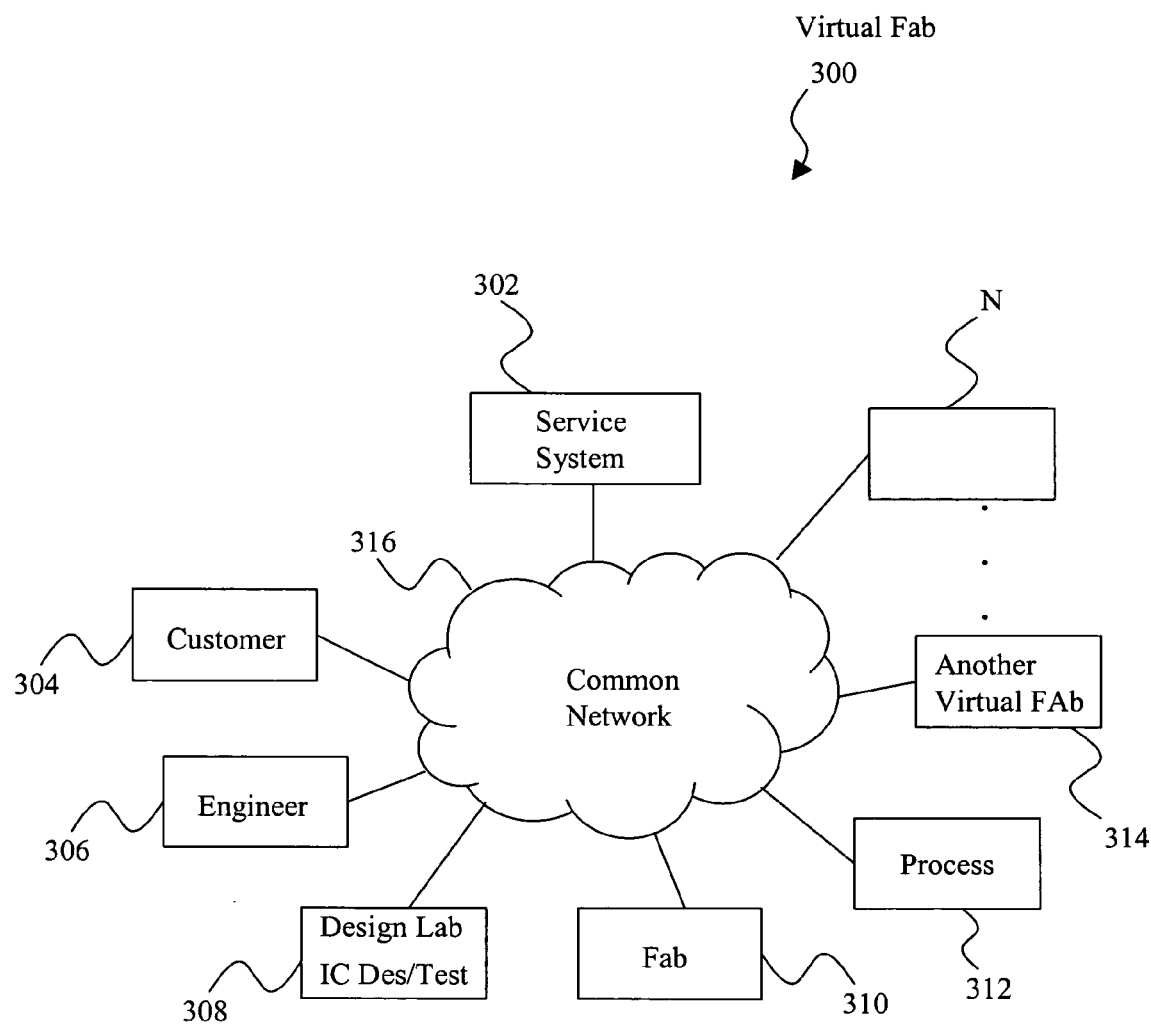
FIG. 3 is a block diagram of another embodiment of a system for inference engine having a parameter-based cost function constructed according to aspects of the present disclosure.
Figure 4:
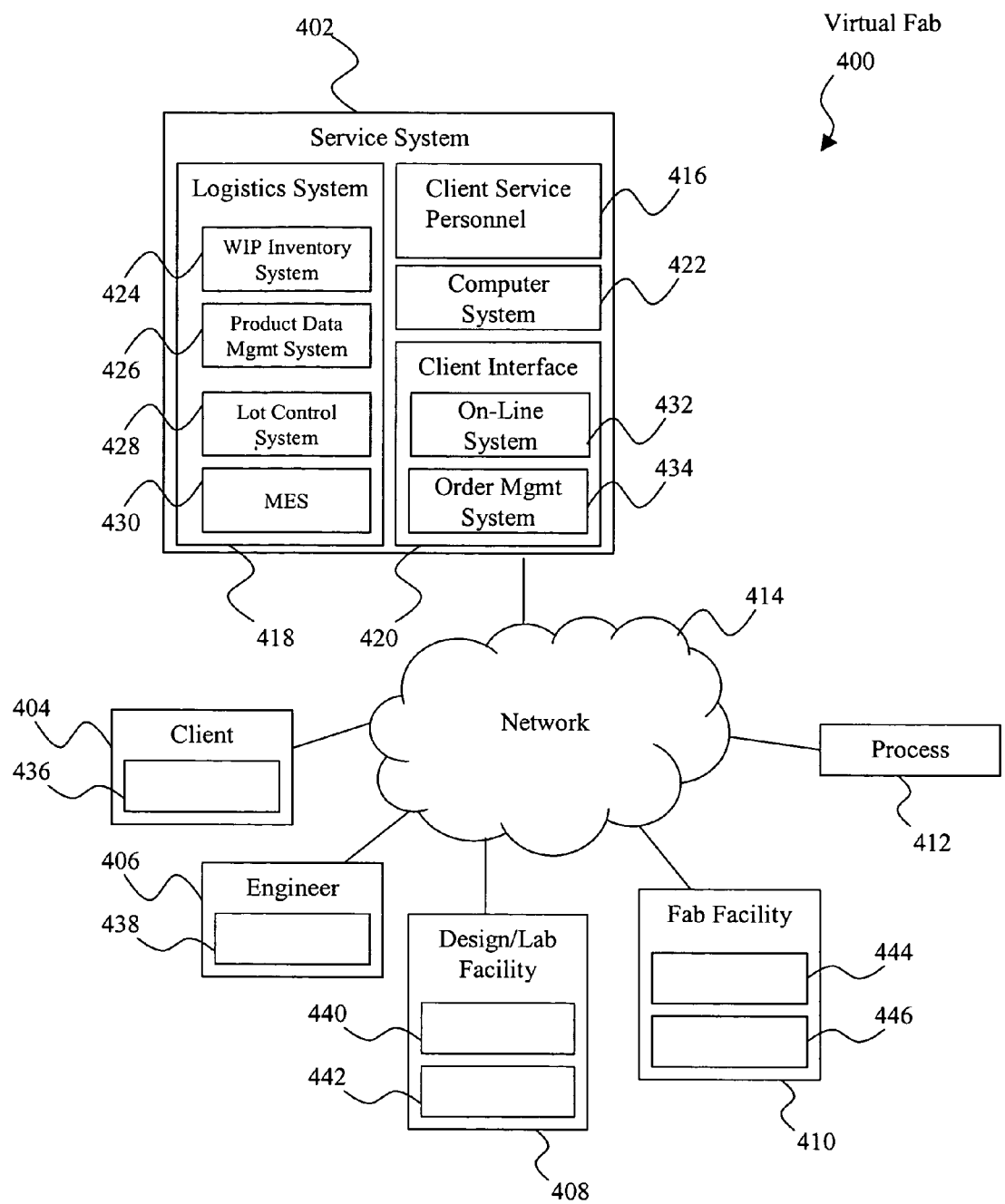
FIG. 4 is a block diagram of another embodiment of a system for inference engine having a parameter-based cost function constructed according to aspects of the present disclosure.

Knowledge collection module 102 functions to collect client information from a plurality of client databases in a virtual fab (described in FIG. 3 and FIG. 4). The client information is represented by parameters, wherein each of the parameters represents clients in one aspect associated with semiconductor manufacturing. Each parameter can take a value of data in a pre-defined range. Examples of parameters include manufacturing technology, product type, volume of purchase order, client physical region, design library, tapeout instance (Tapeout instance represents an individual realization of an IC design cell in a circuit defined in a mask generation file), technology file, and chip implementation. Client products include digital, analog, mixed signal, radio frequency (RF), wireless, memory, high power, and micro-electro-mechanical system (MEMS). Manufacturing technology nodes include 0.50 μm, 0.25 μm, 0.18 μm, 0.13 μm, and 0.09 μm and below. All of the above information can be collected or stored in knowledge collection module 102.

The scope of knowledge used by inference engine 100 covers chip implementation factors such as reference flow, place and route (P&R), and merge service. The scope of knowledge covers IC design library and intellectual property (IP) such as standard cell, standard input/output (I/O), specialty I/O, mixed signal/radio frequency (RF) IP. The scope of knowledge covers technical files such as design rule check (DRC), layout versus schematic (LVS), resistance and capacitance (RC) extraction; tapeout instance such as new tapeout (NTO). The scope of knowledge covers process technology such as 0.18 μm, 0.13 μm, and 0.09 μm and below. The scope of knowledge may further include manufacturing parameters, market data, and product data.

User interface 104 provides an interface for a user to manually interact with inference engine 100 to set up parameters, weighting factors, cost functions, to choose time scope (3 month, 6 month, or 1 year), region scope (USA, Asia, Europe or all), and list scope (top 10 companies, or top 30 companies). User interface 104 also provides an interface for a user to manipulate output including displaying, saving, printing, emailing, trend charting, and reporting.

Calculation module 106 may include a parameter-based cost function 108. In one embodiment of the system, calculation module 106 executes all calculations to produce a client list using parameter-based cost function 108. Such client lists may include prioritizing clients according to their needs, or ranking clients according to client performance, or client technology trends. In implementing calculation, calculation module 106 uses all data collected by knowledge collection module 102, and parameters set up by the user through user interface 104, and parameter-based cost function 108, either built-in or set up by a user.

Parameter-based cost function 108 is defined as a mathematical function having a plurality of parameters related to semiconductor manufacturing. The plurality of parameters includes customer product type, process technology node, volume of customer purchase orders, customer region, and design library involved. Parameter-based cost function 108 may be preset and built into calculation module 106, or set up specifically by the user each time prior to calculation through user interface 104. Parameter-based cost function 108 may further include a plurality of weighting factors corresponding to the plurality of parameters. The plurality of weighting factors will be combined with the plurality of parameters to form cost function 108 for an individual application. For example, if a top ten client in terms of urgent order schedules is needed, then the order schedule may be defined as one parameter and have a dominating weighting. Parameter-based cost function 108 may be a linear function such as a sum of each product of a parameter and its weighting factor. Parameter-based cost function may be a non-linear function. For example, if a task is to produce a list of top 30 companies having higher volume of 0.13 μm or below technologies, then a product of the process technology node and customer order volume may be included in the cost function.

Parameter-based cost function 108 provides a flexible and effective way to identify, predict, evaluate, and analyze client data in diversified and quantitative ways, which can be designed according to individual application. A user can tune the cost function for a targeted priority list by choosing parameters, weighting factors, and functions itself.

Inference engine system 100 may be connected to a virtual fab 110 which is an entity of a network having a plurality of nodes including manufacturing, engineering, semiconductor equipment, design library and a plurality of databases. The virtual fab will be further described in details in FIG. 3. A plurality of clients such as 112 and 114 may be connected to the virtual fab 110.

At least one database 116 is also connected to virtual fab 110. Database 116 may further include a plurality of subdatabases. Database 116 may include parameters and their definition value tables, cost functions, and time scope, region scope, and other information related to the calculation using parameter-based cost function 108.

Clients such as 112 and 114 communicate with manufacturing through the virtual fab 110 for semiconductor manufacturing events such as placing a purchase order, sending a design tape-out, and using design library. Inference engine system 100 can collect all client data related to the manufacturing for quantitative analysis of client behavior, trend, ranking using parameter-based cost function 108.

Figure 2:
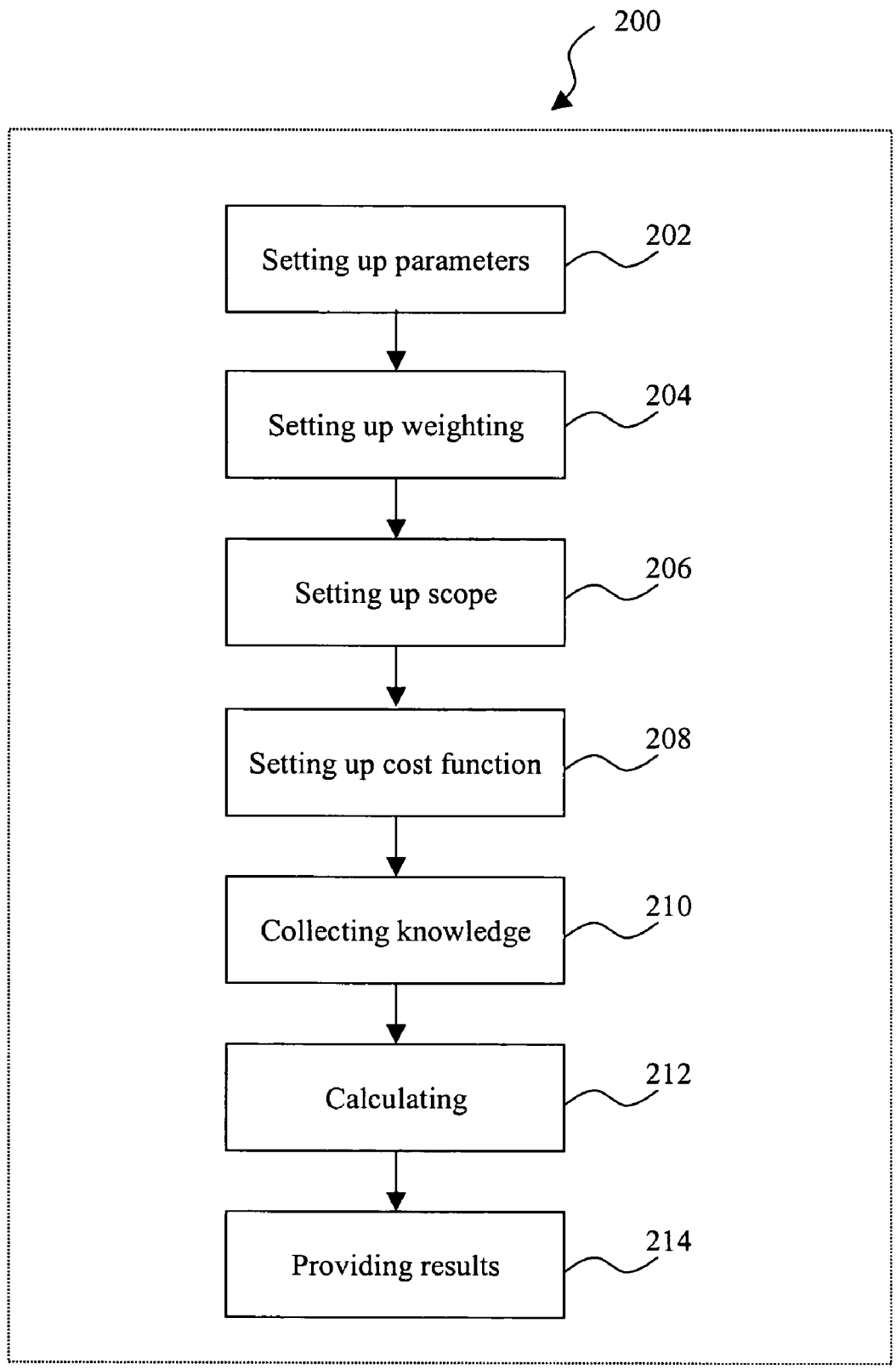
FIG. 2 is a flowchart of one embodiment of a method for an inference engine having a parameter-based cost function constructed according to aspects of the present disclosure.

Referring to FIG. 2, illustrated is a flowchart of one embodiment of a method 200 for operating an inference engine 100 having a parameter-based cost function constructed according to aspects of the present disclosure.

The method 200 begins at step 202 in which a plurality of parameters are selected, defined and set up. Such selection is implemented by a user through user interface module 104. The selection is based on individual application. Each parameter is defined for its value range and how it relates quantitatively to its applications. A parameter, its definition, and its value table may have already been built in database 116, or were defined in previous builds of the inference engine 100, or may need to be defined by the user in this step through user interface 104. Given an example for parameter definition, if a process technology node is chosen as a parameter, then a value table may be defined as follows, 1 for 0.50 μm technology, 2 for 0.25 μm technology, 3 for 0.18 μm technology, 4 for 0.13 μm technology, and 5 for 0.09 μm and below technology.

In step 204, weighting factors are set through user interface module 104. The weighting factors are defined according to individual applications. For example, if a certain parameter is a dominant factor for the current ranking of customers, then heavier weight may be applied to that parameter. The weighting factors may or may not be normalized and, in one embodiment, this will have no impact on the final results of ranking. A weighting factor may not be limited to setting as a fixed value for an individual parameter, so it can be set as a function. For example, for a parameter such as the volume of customer orders, its weighting factor may be chosen as 1 for a volume below 1000 units; 2 for a volume between 1000 and 10000 units; and 5 for a volume between 10000 and above.

In step 206, choosing time scope (3 month, 6 month, or 1 year), region scope (USA, Asia, Europe or all), and list scope (top 10 companies, or top 30 companies) is processed. And other parameters may also be set up for data collection and calculation. For example, if "6 month" was chosen as the time scope, USA and Europe were chosen as region scope, and 10 was chosen as list scope, then knowledge collection 102 will collect information for all clients in USA and Europe in last 6 months; then calculation module 106 will calculate and provide a list of top 10 companies accordingly.

In step 208, parameter-based cost function 108 is defined by a user through the user interface module 104. The user may define a proper mathematical formula for the parameter-based cost function. In one embodiment, the user may only choose one of the parameter-based cost functions built into database 116 or user-defined in previous implementing inference engine 100.

Setting up parameters in step 202, setting up weighting in 204, setting scope in step 206, and setting up a parameter-based cost function in step 208 may proceed in different sequences. Some of these steps are optional, have default setup, and can be changed in later knowledge collections 102 and calculation steps if necessary. For example, if the top 10 companies list is not sufficient in one case, then the list may be changed to top 20, or 30 companies, as desired by the user.

In step 210, inference engine 100 collects knowledge according to parameters selected in step 202. Collecting knowledge is implemented by knowledge collection module 102. Examples of parameters-based knowledge include manufacturing technology, product type, volume of purchase order, client physical region, design library, tapeout instance, technology file, and chip implementation. Client products includes digital, analog, radio frequency (RF), wireless, and memory; manufacturing technology nodes includes 0.50 μm, 0.25 μm, 0.18 μm, 0.13 μm, and 0.09 μm and below. Inference engine 100 is connected to virtual fab 112. Information related to the selected parameters are collected from multiple sources including client databases, design labs, marketing, client service, and manufacturing. Collected information is filtered, sorted, organized for use in the next step of method 200.

In step 212, calculation module 106 implements calculating using the data collected by knowledge collection 102 and parameter-based cost function 108. Calculation may need user involvement if there is any conflict or inconsistency.

In step 214, inference engine 100 provides results to the user as a list of clients. The results may be presented in different formats and media including display, printing, report, trend chart, and email, for example.

Referring now to FIG. 3, a virtual IC fabrication system (a "virtual fab") 300, to which the system 200 of FIG. 2 may be connected, is illustrated. The virtual fab 300 includes a plurality of entities 302, 304, 306, 308, 310, 312, 314, . . . , N that are connected by a communications network 316. The network 316 may be a single network or may be a variety of different networks, such as an intranet and the Internet, and may include both wireline and wireless communication channels.

In the present example, the entity 302 represents a service system for service collaboration and provision, the entity 304 represents a customer, the entity 306 represents an engineer, the entity 308 represents a design/laboratory (lab) facility for IC design and testing, the entity 310 represents a fabrication (fab) facility, and the entity 312 represents a process (e.g., an automated fabrication process), and the entity 314 represents another virtual fab (e.g., a virtual fab belonging to a subsidiary or a business partner). Each entity may interact with other entities and may provide services to and/or receive services from the other entities.

For purposes of illustration, each entity 302-312 may be referred to as an internal entity (e.g., an engineer, customer service personnel, an automated system process, a design or fabrication facility, etc.) that forms a portion of the virtual fab 300 or may be referred to as an external entity (e.g., a customer) that interacts with the virtual fab 300. It is understood that the entities 302-312 may be concentrated at a single location or may be distributed, and that some entities may be incorporated into other entities. In addition, each entity 302-312 may be associated with system identification information that allows access to information within the system to be controlled based upon authority levels associated with each entity's identification information.

The virtual fab 300 enables interaction among the entities 302-312 for the purpose of IC manufacturing, as well as the provision of services. In the present example, IC manufacturing includes receiving a customer's IC order and the associated operations needed to produce the ordered ICs and send them to the customer, such as the design, fabrication, testing, and shipping of the ICs.

One of the services provided by the virtual fab 300 may enable collaboration and information access in such areas as design, engineering, and logistics. For example, in the design area, the customer 304 may be given access to information and tools related to the design of their product via the service system 302. The tools may enable the customer 304 to perform yield enhancement analyses, view layout information, and obtain similar information. In the engineering area, the engineer 306 may collaborate with other engineers using fabrication information regarding pilot yield runs, risk analysis, quality, and reliability. The logistics area may provide the customer 304 with fabrication status, testing results, order handling, and shipping dates. It is understood that these areas are exemplary, and that more or less information may be made available via the virtual fab 300 as desired.

Another service provided by the virtual fab 300 may integrate systems between facilities, such as between the design/lab facility 308 and the fab facility 310. Such integration enables facilities to coordinate their activities. For example, integrating the design/lab facility 308 and the fab facility 310 may enable design information to be incorporated more efficiently into the fabrication process, and may enable data from the fabrication process to be returned to the design/lab facility 310 for evaluation and incorporation into later versions of an IC. The process 312 may represent any process operating within the virtual fab 300.

Referring now to FIG. 4, in another embodiment, a virtual fab 400 illustrates one possible implementation of the virtual fab 300 of FIG. 3. The virtual fab 400 includes a plurality of entities 402, 404, 406, 408, 410, and 412 that are connected by a communications network 414. In the present example, the entity 402 represents a service system, the entity 404 represents a customer, the entity 406 represents an engineer, the entity 408 represents a design/lab facility for IC design and testing, the entity 410 represents a fab facility, and the entity 412 represents a process (e.g., an automated fabrication process). Each entity may interact with other entities and may provide services to and/or receive services from the other entities.

The service system 402 provides an interface between the customer and the IC manufacturing operations. For example, the service system 402 may include customer service personnel 416, a logistics system 418 for order handling and tracking, and a customer interface 420 for enabling a customer to directly access various aspects of an order.

The logistics system 418 may include a work in progress (WIP) inventory system 424, a product data management system 426, a lot control system 428, and a manufacturing execution system (MES) 430. The WIP inventory system 424 may track working lots using a database (not shown). The product data management system 426 may manage product data and maintain a product database (not shown). The product database could include product categories (e.g., part name, part numbers, and associated information), as well as a set of process stages that are associated with each category of products. The lot control system 428 may convert a process stage to its corresponding process steps.

The MES 430 may be an integrated computer system representing the methods and tools used to accomplish production. In the present example, the primary functions of the MES 430 may include collecting data in real time, organizing and storing the data in a centralized database, work order management, workstation management, process management, inventory tracking, and document control. The MES 430 may be connected to other systems both within the service system 402 and outside of the service system 402. Examples of MES systems 430 include Promis™ (a product of Brooks Automation Inc. of Massachusetts), Workstream™ (a product of Applied Materials, Inc. of California), Poseidon™ (a product of IBM Corporation of New York), and Mirl-MES™ (a product of Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications. The MES 430 may include such information as a process step sequence for each product.

The customer interface 420 may include an online system 432 and an order management system 434. The online system 432 may function as an interface to communicate with the customer 404, other systems within the service system 402, supporting databases (not shown), and other entities 406-412. The order management system 434 may manage client orders and may be associated with a supporting database (not shown) to maintain client information and associated order information.

Portions of the service system 402, such as the customer interface 420, may be associated with a computer system 422 or may have their own computer systems. In some embodiments, the computer system 422 may include multiple computers (FIG. 4), some of which may operate as servers to provide services to the customer 404 or other entities. The service system 402 may also provide such services as identification validation and access control, both to prevent unauthorized users from accessing data and to ensure that an authorized customer can access only their own data.

The customer 404 may obtain information about the manufacturing of its ICs via the virtual fab 400 using a computer system 436. In the present example, the customer 404 may access the various entities 402, 406-412 of the virtual fab 400 through the customer interface 420 provided by the service system 402. However, in some situations, it may be desirable to enable the customer 404 to access other entities without going through the customer interface 420. For example, the customer 404 may directly access the fab facility 410 to obtain fabrication related data.

The engineer 406 may collaborate in the IC manufacturing process with other entities of the virtual fab 400 using a computer system 438. The virtual fab 400 enables the engineer 406 to collaborate with other engineers and the design/lab facility 408 in IC design and testing, to monitor fabrication processes at the fab facility 410, and to obtain information regarding test runs, yields, etc. In some embodiments, the engineer 406 may communicate directly with the customer 404 via the virtual fab 400 to address design issues and other concerns.

The design/lab facility 408 provides IC design and testing services that may be accessed by other entities via the virtual fab 400. The design/lab facility 408 may include a computer system 440 and various IC design and testing tools 442. The IC design and testing tools 442 may include both software and hardware.

The fab facility 410 enables the fabrication of ICs. Control of various aspects of the fabrication process, as well as data collected during the fabrication process, may be accessed via the virtual fab 400. The fab facility 410 may include a computer system 444 and various fabrication hardware and software tools and equipment 446. For example, the fab facility 410 may include an ion implantation tool, a chemical vapor deposition tool, a thermal oxidation tool, a sputtering tool, and various optical imaging systems, as well as the software needed to control these components.

The process 412 may represent any process or operation that occurs within the virtual fab 400. For example, the process 412 may be an order process that receives an IC order from the customer 404 via the service system 402, a fabrication process that runs within the fab facility 410, a design process executed by the engineer 406 using the design/lab facility 408, or a communications protocol that facilitates communications between the various entities 402-412.

It is understood that the entities 402-412 of the virtual fab 400, as well as their described interconnections, are for purposes of illustration only. For example, it is envisioned that more or fewer entities, both internal and external, may exist within the virtual fab 400, and that some entities may be incorporated into other entities or distributed. For example, the service system 402 may be distributed among the various entities 406-410.

Figure 5:
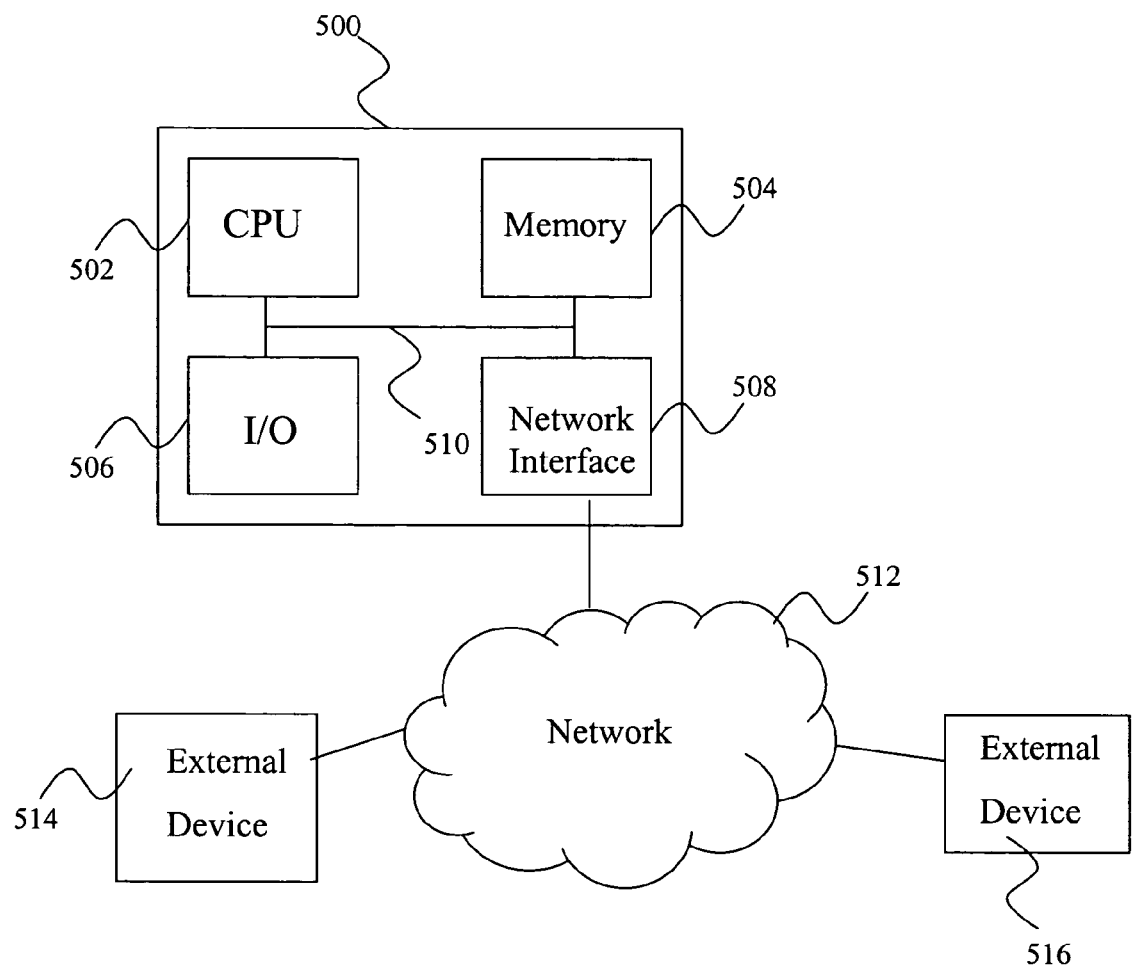
FIG. 5 is a block diagram of one embodiment of a computer used in a system for inference engine having a parameter-based cost function constructed according to aspects of the present disclosure.

Referring now to FIG. 5, an exemplary computer 500, such as may be used within the virtual fab 300 of FIG. 3 or virtual fab 400 of FIG. 4, is illustrated. The computer 500 may include a central processing unit (CPU) 502, a memory unit 504, an input/output (I/O) device 506, and a network interface 508. The network interface may be, for example, one or more network interface cards (NICs). The components 502, 504, 506, and 508 are interconnected by a bus system 510. It is understood that the computer may be differently configured and that each of the listed components may actually represent several different components. For example, the CPU 502 may actually represent a multi-processor or a distributed processing system; the memory unit 504 may include different levels of cache memory, main memory, hard disks, and remote storage locations; and the I/O device 506 may include monitors, keyboards, printer, and the like.

The computer 500 may be connected to a network 512, which may be connected to the networks 316 (FIG. 3) or 414 (FIG. 4). The network 512 may be, for example, a complete network or a subnet of a local area network, a company-wide intranet, and/or the Internet. The computer 500 may be identified on the network 512 by an address or a combination of addresses, such as a media control access (MAC) address associated with the network interface 508 and an internet protocol (IP) address. Because the computer 500 may be connected to the network 512, certain components may, at times, be shared with other devices 514, 516. Therefore, a wide range of flexibility is anticipated in the configuration of the computer. Furthermore, it is understood that, in some implementations, the computer 500 may act as a server to other devices 514, 516. The devices 514, 516 may be computers, personal data assistants (PDA), wired or cellular telephones, or any other device able to communicate with the computer 500.

Referring to FIG. 6, illustrated is a schematic view of one embodiment of a screen display in a method of operating an inference engine having a parameter-based cost function constructed according to aspects of the present disclosure. Screen display 600 is an interface provided to a user to set up. Screen 600 may be one of screens displays during setting up process. Screen 600 may include scope 602, calculation method 604, and weighting 606. Scope 602 includes region, design service agent (DSA), time period, and number of top companies. A user can click the proper buttons to make the desired selections. For example, the particular choices shown selected in FIG. 6 are "All" for region; "Excluded" for DSA; start from "1 month" for time period; and "30" for the number of top companies.

Calculation method 604 may include a non-normalized and normalized selection as shown. The value of cost function may be normalized for clarification. However, in one embodiment, this selection makes no difference for final ranking list.

Weighting 606 provides an interface to define weighting setup. For example, the weighting factor for process technology can be set as 1 if technology node is 0.13 µm or below; and set also as 1 if technology node is between 0.15 µm and 0.25 µm; set as 0 if technology node is 0.25 µm or above. Other weighting values can be selected as desired for the particular application. Other weighting categories for which weighting values can be selected include technology file download, library download, chip implementation, reference flow download, and New tapeout (NTO). These weighting categories are representative. Other weighting categories are possible according to the particular application.

Figure 7:
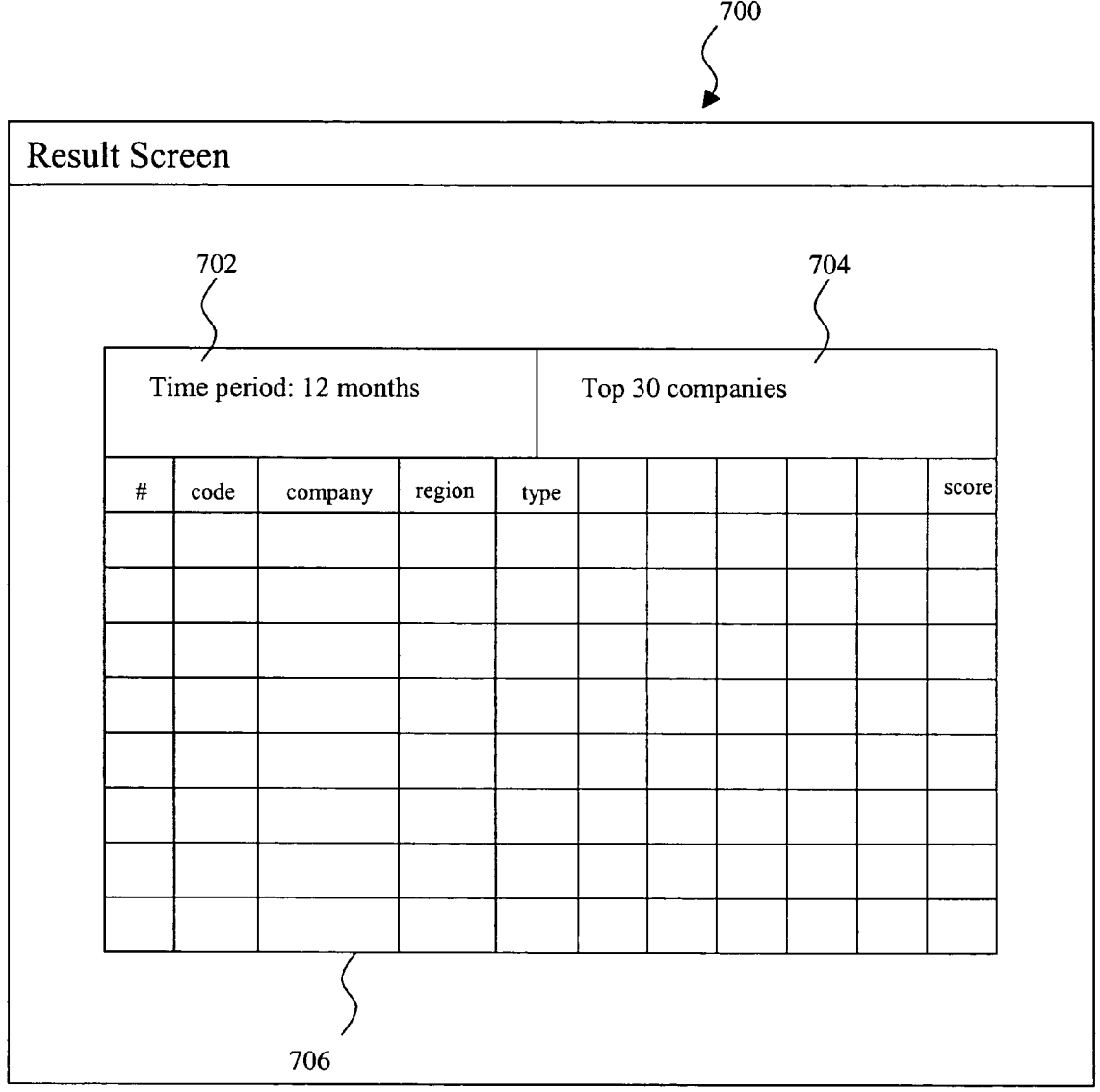
FIG. 7 is a schematic view of another embodiment of a screen display in a method of inference engine having a parameter-based cost function constructed according to aspects of the present disclosure.

Referring to FIG. 7, illustrated is a schematic view of another embodiment of a screen display in a method of operating an inference engine having a parameter-based cost function constructed according to aspects of the present disclosure. Display or screen 700 provides results produced by inference engine 100. To show the results screen 700 displays a heading 702 for time period as 12 months, a heading 704 for top companies as 30, and list 706 of ranked companies. In this particular example, list 706 presents a rank list for the top 30 companies for the last 12 months. List 706 includes a sequence number "#", company "code", "company" name, company "region", company "type", and ranking "score" produced by parameter-based cost function 108, and other parameters. The displayed results may also include a trend chart to show company trends over parameters of interest.

The present embodiments provide an inference engine having a parameter-based cost function and methods to implement thereof. The present disclosure provides ways to evaluate wafer price, manufacturing capacity, intellectual capital, and identify what knowledge could enable customers. The present disclosure may be used as a tool to help predict customer business behavior, find repeated orders and evaluate a customer or customer's business trend.

The present disclosure may not be limited to identifying, predicting, and analyzing customer data. It could be extended to other types of data analysis such as product analysis, equipment analysis, vendor analysis, IC design evaluation, processing evaluation, failure mode analysis (FMA).

The present invention has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A computer program product that includes a computer-readable medium, the medium having stored thereon a sequence of instructions which, when executed by a processor, causes the processor to execute a method, the computer program product comprising:
an inference engine communicably coupled to a virtual fab, wherein the virtual fab comprises a plurality of entities that are communicably coupled via a network, and a database that stores client information, and the virtual fab is configured to:
receive integrated circuit manufacturing orders from a plurality of clients; and
facilitate access to client information by the plurality of clients and the entities as the entities produce the integrated circuit manufacturing orders; and
wherein the inference engine is configured to rank the plurality of clients using at least one parameter associated with each of the plurality of clients, the inference engine comprising:
a knowledge collection module configured to collect client information based on the at least one parameter; and
a calculation module configured to receive the collected information and calculate a client listing ranking the plurality of clients using a parameter-based cost function; and
a user interface operable to:
enable a user to select the at least one parameter associated with each of the plurality of clients;
enable the user to assign at least one weighting factor to the selected at least one parameter associated with each of the plurality of clients;
display the client listing calculated by the calculation module,
wherein the calculation module calculates the client listing based on the selected at least one parameter and the assigned at least one weighting factor for the at least one parameter,
wherein the parameter-based cost function comprises the at least one parameter,
wherein the parameter-based cost function is a linear function including at least one term, wherein each term is a product of one of the selected at least one parameter and one of the assigned at least one weighting factor correspondingly, and
wherein the assigned at least one weighting factor is associated with a weighting category selected from the group consisting of process technology, technology file download, library download, chip implementation, reference flow download, and new tapeout.

2. The computer program product of claim 1 wherein the at least one parameter includes one of manufacturing technology, product type, volume of purchase order, client physical region, design library, tapeout instance, technology file, and chip implementation.

3. The computer program product of claim 2 wherein the manufacturing technology includes 0.13 m and below, 0.15 m to 0.25 m, and 0.25 m and above.

4. The computer program product of claim 2 wherein the product type includes one of digital, analog, mixed signal, radio frequency (RF), memory, micro-electro-mechanical system (MEMS), and high power.

5. The computer program product of claim 1 wherein the parameter-based cost function is built in the calculation module.

6. The computer program product of claim 1 wherein the parameter-based cost function is set up by a user.

7. The computer program product of claim 1 wherein the knowledge collection module collects the client information from a plurality of client databases in the virtual fab.

8. The computer program product of claim 1 wherein the virtual fab is an entity of a communications network.

9. The computer program product of claim 8 wherein the entities include:
a manufacturing entity;
an engineer entity;
a foundry entity; and
a design library entity.

10. The computer program product of claim 1 wherein the user interface provides an interface of communication between the user and the inference engine.

11. A computer program product that includes a computer-readable medium, the medium having stored thereon a sequence of instructions which, when executed by a processor, causes the processor to execute a method of calculating a client listing using an inference engine communicably coupled to a virtual fab, wherein the virtual fab comprises a plurality of entities that are communicably coupled via a network, and a database that stores client information, and the virtual fab is configured to:
receive integrated circuit manufacturing orders from a plurality of clients; and
facilitate access to client information by the plurality of clients and the entities as the entities produce the integrated circuit manufacturing orders; and, the method comprising:
selecting parameters associated with each of the plurality of clients;
assigning weighting factors to the selected parameters;
collecting knowledge relating to the selected parameters;
selecting a time scope and a geographical region scope, wherein the time scope represents a duration of time for collecting knowledge related to the selected parameters associated with each of the plurality of clients, wherein the geographical region scope represents a geographic region designating a location of at least one client from the plurality of clients; and
calculating a parameter-based cost function from the collected knowledge; and
providing a client listing, wherein clients are ranked according to values of the parameter-based cost function, the selected time scope, and the selected geographical region scope,
wherein the parameter-based cost function comprises the selected parameters, and
wherein the parameter-based cost function is a linear function including a term, wherein each term is a product of one of the selected parameters and one of the assigned weighting factors, each of the assigned weighting factors associated with a weighting category selected from the group consisting of process technology, technology file download, library download, chip implementation, reference flow download, and new tapeout.

12. The computer program product of claim 11 including setting up a value table for each of the selected parameters.

13. The computer program product of claim 11 wherein collecting knowledge includes tracking client data associated with relevant parameters.

14. The computer program product of claim 11 further comprising setting up parameter-based cost functions.

15. The computer program product of claim 14 wherein setting up parameter-based cost functions includes selecting function type.

16. The computer program product of claim 14 wherein setting up parameter-based cost functions includes defining a function by a user.

17. A system comprising:
a virtual fab that manufactures one or more products for a plurality of clients, wherein the virtual fab comprises a plurality of entities that are communicably coupled via a network, and a database that stores client information, and the virtual fab is configured to:
receive integrated circuit manufacturing orders from a plurality of clients; and
facilitate access to client information by the plurality of clients and the entities as the entities produce the integrated circuit manufacturing orders; and
wherein at least one parameter is associated with each of the plurality of clients; and
a computer program product that includes a computer-readable medium, the medium having stored thereon a sequence of instructions which, when executed by a processor, causes the processor to execute a method, the computer program product comprising: an inference engine communicably coupled to the virtual fab, wherein the inference engine is configured to rank the plurality of clients using the at least one parameter, the inference engine comprising:
a knowledge collection module configured to collect client information based on the at least one parameter;
a calculation module configured to receive the collected information and calculate a client listing ranking the plurality of clients using a parameter-based cost function; and
a user interface operable to:
enable a user to select the at least one parameter associated with each of the plurality of clients;
enable the user to assign at least one weighting factor to the selected at least one parameter associated with each of the plurality of clients;
display the client listing calculated by the calculation module,
wherein the calculation module calculates the client listing based on the selected at least one parameter and the assigned at least one weighting factor for the at least one parameter,
wherein the parameter-based cost function comprises the at least one parameter,
wherein the parameter-based cost function is a linear function including at least one term, wherein each term is a product of one of the selected at least one parameter and one of the assigned at least one weighting factor correspondingly, and
wherein the assigned at least one weighting factor is associated with a weighting category selected from the group consisting of process technology, technology file download, library download, chip implementation, reference flow download, and new tapeout.

18. The computer program product of claim 11, wherein calculating the parameter-based cost function from the collected knowledge further includes calculating the client listing based on the calculated parameter-based cost function, the selected time scope, and the selected geographical region scope.

19. The computer program product of claim 1, wherein the user interface is operable to enable the user to select a time scope and a geographical region scope, wherein the time scope represents a duration of time for which the knowledge collection module collects client information based on the selected at least one parameter from the plurality of clients, wherein the geographical region scope represents a geographic region designating a location of at least one client for which the knowledge collection module collects client information based on the at least one parameter from the plurality of clients, and wherein the calculation module calculates the client listing based on the selected at least one parameter, the assigned at least one weighting factor for the at least one parameter, the selected time scope, and the selected geographical region scope.

20. The computer program product of claim 19, wherein the geographical region scope is one of U.S.A, Asia, Europe, and a combination thereof.

21. The computer program product of claim 19, wherein the time scope is one of three months, six months, or one year.

22. The system of claim 17, wherein the user interface is operable to enable the user to select a time scope and a geographical region scope, wherein the time scope represents a duration of time for which the knowledge collection module collects client information based on the selected at least one parameter from the plurality of clients, wherein the geographical region scope represents a geographic region designating a location of at least one client for which the knowledge collection module collects client information based on the at least one parameter from the plurality of clients; and wherein the calculation module calculates the client listing based on the selected at least one parameter, the assigned at least one weighting factor for the at least one parameter, the selected time scope, and the selected geographical region scope.

\* \* \* \* \*